United States Patent
Gerken

(10) Patent No.: US 12,030,284 B2
(45) Date of Patent: Jul. 9, 2024

(54) COMPONENT WITH A TRANSLUCENT SURFACE WITH A VARIABLE SHAPE

(71) Applicant: Benecke-Kaliko AG, Hannover (DE)

(72) Inventor: Andreas Gerken, Hannover (DE)

(73) Assignee: Benecke-Kaliko AG, Hannover (DE)

( * ) Notice: Subject to any disclaimer, the term of this patent is extended or adjusted under 35 U.S.C. 154(b) by 1065 days.

(21) Appl. No.: 16/771,535

(22) PCT Filed: Oct. 8, 2018

(86) PCT No.: PCT/EP2018/077271
§ 371 (c)(1),
(2) Date: Jun. 10, 2020

(87) PCT Pub. No.: WO2019/115053
PCT Pub. Date: Jun. 20, 2019

(65) Prior Publication Data
US 2021/0170728 A1    Jun. 10, 2021

(30) Foreign Application Priority Data
Dec. 15, 2017    (DE) .................. 10 2017 222 957.8

(51) Int. Cl.
*B32B 27/08* (2006.01)
*B32B 3/26* (2006.01)
(Continued)

(52) U.S. Cl.
CPC .............. *B32B 27/08* (2013.01); *B32B 3/266* (2013.01); *B32B 3/30* (2013.01); *B32B 27/40* (2013.01);
(Continued)

(58) Field of Classification Search
CPC .... B60K 37/20; B60K 2360/00; B60K 35/22; B60K 2360/1438; B60K 2360/143;
(Continued)

(56) References Cited

U.S. PATENT DOCUMENTS

2006/0097991 A1    5/2006   Hotelling et al.
2007/0039809 A1    2/2007   Aihara et al.
(Continued)

FOREIGN PATENT DOCUMENTS

CA    2828809 A1 *  9/2012    ............. H01L 41/25
CN    113515189 A *  10/2021   ............. G06F 3/016
(Continued)

OTHER PUBLICATIONS

Chinese Office action dated Mar. 30, 2022 of counterpart CN application 201880080812.8.
(Continued)

*Primary Examiner* — Lori Lyjak
(74) *Attorney, Agent, or Firm* — Gregory Adams; Richard Wolf

(57) ABSTRACT

A component with an exterior decorative surface and with signaling or operating elements arranged in the surface or near the surface, in particular an interior trim component of a vehicle, wherein the component comprises a component carrier as supporting structure or substructure and a multi-layered film arranged on the exterior thereof, wherein the film comprises a layer composite composed of at least one outer cover layer which is at least partly light-transmissive and is optionally provided with a coating, and at least one further layer which is at least partly light-transmissive and is arranged on the rear side of the cover layer, wherein the layers forming the film consist of a flexible, elastomeric and reversibly deformable polymer, and the component carrier comprises devices which act on the film for the at least regional deformation of the film, i.e. deformation that concerns partial regions of the surface, and also devices for the at least regional transillumination of the film.

8 Claims, 2 Drawing Sheets

(51) Int. Cl.
   *B32B 3/30* (2006.01)
   *B32B 27/40* (2006.01)
   *B60K 35/00* (2024.01)
   *B60K 35/10* (2024.01)
   *B60K 35/22* (2024.01)
   *B60K 35/50* (2024.01)
   *B60K 35/60* (2024.01)
   *B60K 37/20* (2024.01)

(52) U.S. Cl.
   CPC .............. *B60K 35/00* (2013.01); *B60K 35/10* (2024.01); *B60K 35/50* (2024.01); *B60K 35/60* (2024.01); *B32B 2307/412* (2013.01); *B32B 2307/414* (2013.01); *B32B 2457/208* (2013.01); *B32B 2605/006* (2013.01); *B32B 2605/08* (2013.01); *B60K 35/22* (2024.01); *B60K 37/20* (2024.01); *B60K 2360/00* (2024.01); *B60K 2360/143* (2024.01); *B60K 2360/1434* (2024.01); *B60K 2360/1438* (2024.01); *B60K 2360/339* (2024.01)

(58) Field of Classification Search
   CPC ...... B60K 2360/339; B60K 2360/1434; B60K 35/00; B60K 35/60; B60K 35/10; B60K 35/50; B60K 37/00; B32B 27/08; B32B 3/266; B32B 3/30; B32B 27/40; B32B 2307/412; B32B 2307/414; B32B 2457/208; B32B 2605/006; B32B 2605/08; B32B 2255/10; B32B 2255/26; B32B 2307/202; B32B 2307/15; B32B 2457/20; B32B 2551/00; B32B 27/283; B32B 25/08; G05G 1/02
   See application file for complete search history.

(56) References Cited

U.S. PATENT DOCUMENTS

| | | | |
|---|---|---|---|
| 2010/0310814 | A1 | 12/2010 | Thielcke et al. |
| 2012/0156445 | A1* | 6/2012 | Schmidt ................ B32B 27/308 |
| | | | 156/247 |
| 2016/0201874 | A1 | 7/2016 | Stemmer et al. |
| 2017/0291536 | A1 | 10/2017 | Cannon |
| 2020/0139814 | A1* | 5/2020 | Galan Garcia ......... B32B 5/022 |

FOREIGN PATENT DOCUMENTS

| | | | | |
|---|---|---|---|---|
| DE | 102005032717 | B3 | 8/2006 | |
| DE | 102006038025 | A1 | 3/2007 | |
| DE | 102008055865 | A1 | 5/2010 | |
| DE | 102011012838 | A1 * | 9/2012 | ............. B60K 35/00 |
| DE | 102011018897 | A1 * | 10/2012 | ............. B60K 35/00 |
| DE | 102011114362 | A1 * | 3/2013 | ............ B29C 70/086 |
| DE | 102012220653 | A1 * | 6/2014 | ............. B62D 1/046 |
| DE | 102014019245 | A1 | 6/2016 | |
| DE | 102015122689 | A1 | 7/2016 | |
| DE | 102015007822 | A1 * | 12/2016 | ............. B60K 35/00 |
| DE | 102016106539 | A1 | 10/2017 | |
| DE | 112021002872 | T5 * | 4/2023 | ............. B60K 35/00 |
| EP | 2233366 | A1 | 9/2010 | |
| FR | 2958422 | A1 * | 10/2011 | ............. B60K 35/00 |
| JP | 2012141913 | A * | 7/2012 | ............. B60K 35/00 |
| WO | WO-2013030090 | A1 * | 3/2013 | ......... B29C 44/1257 |
| WO | WO-2016096099 | A1 * | 6/2016 | |

OTHER PUBLICATIONS

International Search Report dated Dec. 12, 2018 of International PCT/EP2018/077271 which this application is based on.

\* cited by examiner

COMPONENT WITH A TRANSLUCENT SURFACE WITH A VARIABLE SHAPE

BRIEF SUMMARY

The invention relates to a component with an exterior decorative surface and with signaling or operating elements arranged in the surface or near the surface, in particular an interior trim component of a vehicle, wherein the component comprises a component carrier as supporting structure or substructure and a multilayered film arranged on the exterior thereof, wherein the film comprises a layer composite composed of at least one outer cover layer which is at least partly light-transmissive and is optionally provided with a coating, and at least one further layer which is at least partly light-transmissive and is arranged on the rear side of the cover layer.

In the field of automotive interiors it is possible to observe a significant trend toward improving the impression of quality. This trend has had the effect that in many of the typical film applications in the form of shaped bodies in the area of decoration, criteria such as grip, "feel" (haptics) and the entire visual and tactile appearance have acquired very great importance in the assessment by customers.

On the other hand, the general increase in digitization and the ever increasing demand for convenience devices in the area of vehicle equipment, for example, have the effect, not just in these areas, that there is a desire for ever greater individualization of functions, objects or environments. Staying with vehicles, it is already known, for the purpose of closing or opening doors, to use systems which, when a key or key transmitter associated with a keyless entry system approaches a vehicle, enable the latter to be unlocked. Systems that trigger such functions on the basis of a fingerprint check or by means of individual voice control/speech recognition are likewise already known.

In this regard, recently covering materials or flexible surface materials have also been concomitantly included as functional or sensor elements in controllers. Such flexible surface materials having sensor or signaling elements are known in the field of motor vehicle technology, for example. The starting point here is considerations concerning the "functionalization" of hitherto only decorative surfaces or coating films in the interior of motor vehicles, i.e. for the integration of a sensor system into the user interface of objects, with the aim of providing operator control functions. As far as flexible films with grained or embossed surfaces are concerned, such as for example imitation leather films for the interior of an automobile, which not only are subjected to extreme strains during production and when they are being applied to the fixed carriers but also undergo extremely high temperature fluctuations during operation, the integration of a sensor system is however difficult, and therefore has not so far been adopted in practice.

On the other hand, touch sensors are already established as an HMI (=Human-Machine Interface) in many areas, for example as touch-screen devices on smartphones. Such operating elements or functions make intuitive operation possible while at the same time avoiding mechanical buttons, switches, rotary controllers or dials.

Developments similar to those in the case of the operating elements mentioned have taken place in the case of vehicle device settings adapted to the occupants of a vehicle, such as, for instance, seats, mirror settings, steering wheel heights, etc. In this context, however, in the meantime and with the aim of individualization/personalization as discussed initially, a desire has arisen for systems which can automatically recognize which occupant is present and set the basic setting of vehicle devices that is preferred by said occupant.

If such a survey of technical fields is expanded to include the design of surfaces as such, e.g. in vehicle interiors/motor vehicle interiors, in that case decorative surface materials are generally known for a multiplicity of objects. In this regard, for example, dashboards, seat covers and door linings for motor vehicles have leather or textile covers, or else imitation-leather interior trims/plastic interior trims with three-dimensionally embossed surfaces or a grain structure.

Films for the interior trim of motor vehicles, for furniture, bags etc., commonly also referred to as imitation leather, often have a multilayered structure, are often foam-backed and exhibit three-dimensionally structured surfaces having a wide variety of shapes and configurations on their top side. The multilayered structure generally consists of an upper cover layer or decorative layer, which is provided with the embossed or impressed surface, and one or more lower layers. The top layer is generally provided with a coating layer and may also be colored. By formulating the layers appropriately, including by adapted softness or by the already mentioned foamed layers, a pleasing haptic effect is obtained, i.e. the desired appealing "soft" feel of the plastic film and also a certain sheen, i.e. certain reflection properties.

Furthermore, the prior art discloses planar sensors, for example embodied as touch sensors, as resistive and capacitive systems. Resistive systems are generally based on two plies comprising electrically conducting or semiconducting material (often ITO=indium tin oxide), the two plies being spaced apart by a thin layer of air or microdots. Pressure applied to a certain point has the effect that the two plies come into contact and an electrical measurement signal that is transmitted through the lower layer is thereby changed. As a result, the point of contact can be localized. Such systems are standard for rigid applications such as displays of telephones and operating devices. However, applications that are flexible and at the same time extensible cannot be realized in this way.

Capacitive touch sensors are based on a capacitive coupling effect. Suitable coating of a substrate makes it possible to realize even a large number of touch sensors which are independent of one another and which also allow the simultaneous detection of a large number of points of contact. Typically, the surface area to be touched is provided with a sensor array, i.e. with an arrangement of a multiplicity of horizontal and vertical sensors, which serve as transmitters or receivers of electrical signals. Such a system is disclosed by US 2006097991 A1, which discloses what is known as a "touch panel", which has a transparent capacitive sensor arrangement, which can detect different positions of touches on the operating area or functional area and can convert them into signals.

Sensors on the basis of conductive textiles are also known. Such sensors are flexible and extensible. However, the conductive textile threads usually used here either have to be processed in conventional textile processing methods (knitting, weaving, etc.), and so only planar individual/separate electrical structures can be produced, without a user-defined geometry. As an alternative, the conductive threads can be embroidered onto a textile substrate in a user-defined manner, with the result that a complicated work process is required and the textile flatness is adversely influenced to a considerable extent.

To summarize, it can be stated that in the prior art, in many more or less adjacent technical fields, there are many approaches for the functionalization of films or flat layers, linings or coverings. However, hitherto there have been few surfaces, films or coatings which are also individualizable or personalizable with regard to individual haptic perception, that is to say the touching, feeling, spatial and environment-oriented "grasping" of an object.

In the meantime the desire has also clearly arisen to design the surfaces in a motor vehicle such that certain functions are actually provided for the driver or the occupants only when they are required. On the other hand, surfaces are intended to be embodied such that, in certain situations, warning indications can be effected by special illumination or by signaling, for instance. In this case, in the normal state, as already explained above, the surfaces are intended to have a uniform appearance with no interruptions and to give the occupants as uniform and haptically pleasing a sensation as possible.

With regard to e.g. illuminated or backlit interior trim parts, e.g. DE 10 2016 106 539 A1 discloses an interior trim part of a motor vehicle which comprises a carrier layer, a cover layer on a front side of the carrier layer and an illumination unit on an opposite rear side of the carrier layer. The carrier layer has a perforation that forms an illuminated structure when the illumination unit emits light through the perforation. In this way, special switchable illumination enables the vehicle interior to be individualized, while without backlighting the film provides an appearance with uniformly the same color and shape.

DE 10 2015 122 689 A1 discloses a decorative device in the exterior area of motor vehicles which comprises a decorative coated surface and a backlit assembly having a lens arrangement/lens assembly and also a light generator having an LED and an optical waveguide. If the LED is not illuminated, the lens assembly shows a chrome appearance, and if the LED is illuminated, light is emitted through the lens assembly.

The invention thus addressed the problem of providing a component with a surface that is improved with regard to individualization and personalization and has high haptic quality, wherein the component is provided with a decorative, functional, flexible surface of this type which can change its surface geometry temporarily and totally reversibly, and wherein, for rounding off the requirement profile, the component also includes functionalization in the form of illumination or emission of light signals and comprises integrated actuating devices and operating elements.

This problem is solved by features of the main claim. Further advantageous embodiments are disclosed in the dependent claims. A method in which the component according to the invention is applicable in a particularly advantageous manner is likewise disclosed.

In this case, the layers that form the film situated on the exterior of the component consist of a flexible, elastomeric and reversibly deformable polymer. For this purpose, a component carrier comprises devices which act on the film for the at least regional deformation of the film, and devices for the at least regional transillumination of the film. The term "regional" here denotes lateral surface regions, that is to say surface regions extending perpendicularly to the thickness of the film.

The at least partial deformation of the film as such is preferably oriented substantially perpendicularly to the surface and includes an outwardly directed partial bulging of the film, or bulging restricted to partial regions of the surface, or a partial depression of the film, or depression restricted to partial regions of the surface, below the surrounding surface level. Thus, in other words, a specific surface region of the film is embodied as prominently projecting or conspicuously recessed, but at all events is designed not only visibly, but also tactilely, that is to say haptically, extremely conspicuously.

The surface of the component can thus be deformed and backlit as necessary, as described in greater detail below, wherein without illumination and deformation and at first glance the surface of the component according to the invention offers a uniform pleasing image and is indistinguishable from a conventional surface without additional functions.

One advantageous development consists in the fact that the devices for at least partial or transillumination restricted to partial regions of the surface are arranged in or near the film regions which are subjected to a deformation by the devices which act on the film, wherein advantageously the layer composite forming the film comprises one or a plurality of transparent, non-colored polymer layers and/or one or a plurality of translucent, colored polymer layers, preferably pigmented polymer layers, wherein the film or the layer composite is embodied overall as at least partly light-transmissive.

A further advantageous embodiment consists in the fact that the layers forming the film consist of polyurethane, silicone or latex. The material is constituted such that even after a large number of deformations, the capability of reversible deformation is maintained and no strains remain.

The embodiment of the film according to the invention thus consists of a layer composite, for example of a surface-structured or grained flexible and elastomeric surface layer, for instance of a transparent or translucent polymer composed of polyurethane, silicone or a latex, for example. In this case, further transparent or translucent layers on the basis of a flexible and elastomeric polymer, for example composed of polyurethane, silicone or a latex, can optionally be provided. Furthermore, at least one pigmented or colored layer on the basis of flexible and elastomeric polymers, namely polyurethane, silicone or a latex, is provided which is colored, however, only to the extent that the overall composite is still light-transmissive. Optionally, further transparent or translucent layers on the basis of a flexible and elastomeric polymer, for example polyurethane, silicone or latex, can be provided here as well.

Translucency should be understood here as partial light transmissivity of a layer or body. Translucency is often not differentiated exactly from transparency. The latter, with regard to electromagnetic radiation in physics, is the ability of matter to allow electromagnetic waves to pass through. Here transparency is related to light, namely to the spectral range of electromagnetic radiation that is visible to human beings. Consequently, here transparency should be understood as total light transmissivity and translucency as only partial, that is to say partly afforded, light transmissivity.

The colored layer is advantageously a homogenous and uniform thick layer in which the surface structure has no adverse effects on the homogeneity of the thickness of this layer in the overall composite. In this case, the degree of coloration is advantageously such that, in the case of a non-illuminated background, the film appears to be homogeneously colored throughout and the translucency becomes visible only when a light source is switched on or in the case of an illuminated background. In this regard, e.g. illuminated symbols can shine through the film composite.

In this case, a further advantageous embodiment consists in the fact that the devices for transillumination are embodied as light sources arranged in the component carrier or on the rear side of the component carrier, in particular in interplay with a further advantageous embodiment, which consists in the fact that a stencil consisting of light-non-transmissive material and having light-transmissive cutouts is laminated in or arranged between light source and cover layer, wherein the cutouts can be embodied in the form of pictograms or alphanumeric characters, for instance.

Such symbol representations or else the representation of other patterns are indeed possible by virtue of the fact that a separate stencil having defined openings is provided, such that the cutouts thereof become visible during transillumination as a symbol or image through the translucent film. Such a stencil can, of course, with defined light passage openings, also be printed or laminated onto the rear side of this film composite. Thus, luminous symbols that display an operating panel or reproduce information may also be visible besides diffuse backlighting.

The switching on of one or a plurality of light sources behind the film composite for decorative purposes, for displaying information or in order to identify the location of switches and controllers can be effected by virtue of the fact that the light is switched on in a controlled manner as a result of a specific external situation or because e.g. a hand is approaching, which is identified by a camera, IR sensor or capacitive sensor. Particularly in the case where a capacitive sensor system is used, the latter can be situated separately behind the film or be realized by capacitive sensors being printed on one of the film plies.

Of course, in the case of such transillumination of the film, it is necessary that the composite be totally free of faults at this location. In this regard, no dusters or inhomogeneous pigment or dye distribution, for instance, shall be permitted here. This would also be the case, for example, if the pigments or dyes were situated in the structured surface layer, which, as a result of the grain structure, then reveals an inhomogeneous thickness and varying coloration as a result during transillumination on account of the thickness-dependent dye or pigment concentrations. A further advantageous embodiment therefore consists in the fact that the layer composite forming the film comprises an outer grained or structured layer embodied as transparent.

According to the invention, inhomogeneous pigment or dye distribution can be prevented moreover by means of an adapted layer structure and combination of transparent and translucent layers.

A further advantageous embodiment consists in the fact that the devices for the deformation of the film are arranged as actuators arranged in the component carrier, preferably embodied as stamps that are displaceable perpendicularly to the surface of the component, or as actuators that displace or move partial surfaces of the component carrier. The film situated on the component is stretched somewhat upon actuation of the actuators, but is only reversibly deformed and returns to its original position again as soon as the actuators are switched off or retracted. Afterward, an alteration of the surface is no longer discernible and the entire impression remains undisturbed. Of course, an alteration of the geometry of the surface could also be achieved by individual, separate, divided-off surface parts being adjusted by means of servomotors. This is undesirable for design reasons, however, since visible seams or cut edges disturb the visual impression. By contrast, the embodiment according to the invention allows a haptically and visually satisfactory surface to be provided, which provides corresponding areas for actuation as it were only on request.

A further advantageous embodiment consists in the fact that sensors for identifying the approach of objects or persons or for identifying touches are arranged in the component carrier or in the layer composite of the film, preferably are arranged in or near the film regions that are subjected to a deformation by the devices which act on the film. Such a sensor system can be realized very easily even in films, inter alia by means of planar printed circuits as well.

A further advantageous embodiment consists in the fact that the actuators, stamps or displaceable partial surfaces are embodied as switches or controllers, signaling or operating elements or include such elements.

To summarize, the main advantage of the component according to the invention is that the film that forms the surface, upon the action of an external force and subsequent load relief, is deformable totally reversibly and highlights, signals or illuminates functional areas on request.

In this regard, the decorative film can be secured as a cover on a carrier part, individual regions of the film not being secured or adhesively bonded, and can be deformed at a non-secured location e.g. by means of a mechanical actuator/stamp. By means of such an actuator, e.g. a previously superficially invisible switch panel can be raised up, which as a result—if appropriate also structurally in terms of its shape—becomes visible on the other side of the film and can then be operated by means of the film. After operation has been performed, the actuator/stamp with the switch panel can be lowered again and the film deforms back again reversibly, with the result that the surface appears homogeneous again and the switch panel is invisible again.

Advantageously, such a process can also be combined with the above-described approach identification, the representation of symbols during transillumination and a capacitive sensor system, such that the illumination behind the film switches on when a hand approaches and the switch panel is raised up, such that the latter becomes apparent in the covering film and the operating elements are identifiable by means of the symbols. The latter can then be operated by way of a resistive or capacitive sensor system, for example.

After operation has been performed and the hand has been removed, once again the operating panel also disappears and the illumination is switched off.

Possibilities for the embodiment of the multilayered film arranged on the exterior of the component according to the invention are presented by way of example below.

In this regard, such a film structure can be realized by a first, non-colored or non-pigmented surface layer being produced in a transfer coating method preferably using a structured or grained auxiliary carrier. Said surface layer can also additionally be provided with one or a plurality of coating layers in a later method step.

Optionally, a thin mediator or primer layer can then be applied in a transfer coating method or in a printing method, after which a further non-colored or non-pigmented curable polymer composition is likewise applied in a transfer coating method, wherein the polymer composition forms an elastic layer after curing. By way of example, silicone or polyurethane can be applied as the polymer composition.

Optionally, this is then followed by again applying a thin mediator or primer layer and possible further non-colored curable polymer compositions, thereby ensuring that, on the side visible during production, the original structure or grain structure of the auxiliary carrier is no longer visible or that the surface is smooth to the greatest possible extent. It should be noted briefly here that the side visible during production by the transfer coating method, later on the component, is situated on the rear side of the film or is directed toward the rear side of the film.

Provision can then optionally be made for applying one or a plurality of layers composed of non-colored curable polymer compositions and applying at least one layer composed of a colored or pigmented curable polymer composition. This is carried out in such a way that the overall composite is still partially light-transmissive, that is to say is translucent.

Optionally, further colored or pigmented curable polymer layers are applied, always in such a way that the overall composite is still light-transmissive.

It may be advantageous, for the purpose of accurately setting a specific light transmissivity, to use a plurality of colored or pigmented layers with different layer thicknesses or/and with different proportions of dyes or pigments.

If only certain regions are intended to be visible during transillumination, it is advantageous to apply a light-non-transmissive print behind one or a plurality of layers, said print leaving certain regions blank for the representation of pictograms, for example. The same effect can also be achieved by laminating a flexible filmlike stencil behind an arbitrary layer. Such effects are also possible by introducing films or laminates having defined light passage openings.

With or without combination with such a layer restricting the passage of light, electrically conductive structures can also be printed or introduced by the lamination of a separate film printed with electrically conductive structures.

In this regard, capacitive or resistive sensor functions, antenna functions, heating functions or the like can be introduced in addition to the morphing and light-transmissive function. In the simplest case, such films having a function restricting the passage of light or an electrically conductive function can be introduced separately between a light source and the component according to the invention.

The component according to the invention can be used particularly advantageously in a method for operation or operational control of preferably electrically operated devices in a motor vehicle wherein switches or controllers, signaling or operating elements, with the aid of signals of the sensors for identifying approach or touch that are situated in the layer composite of the film, are illuminated, activated and positioned prominently by actuators in the case of an outwardly directed partial bulging or depression of the film. Moreover, it can advantageously be used if an inductive charger for an appliance that operates with a rechargeable battery, preferably a cellular phone, in the motor vehicle is activated with the aid of signals of the sensors situated in the layer composite of the film, wherein the charging position for the appliance is produced by a depression in the film, said depression having been produced with the aid of the actuators.

BRIEF DESCRIPTION OF THE SEVERAL VIEWS OF THE DRAWINGS

The invention will be explained in greater detail on the basis of an exemplary embodiment. In the figures.

DETAILED DESCRIPTION

Figure 1:
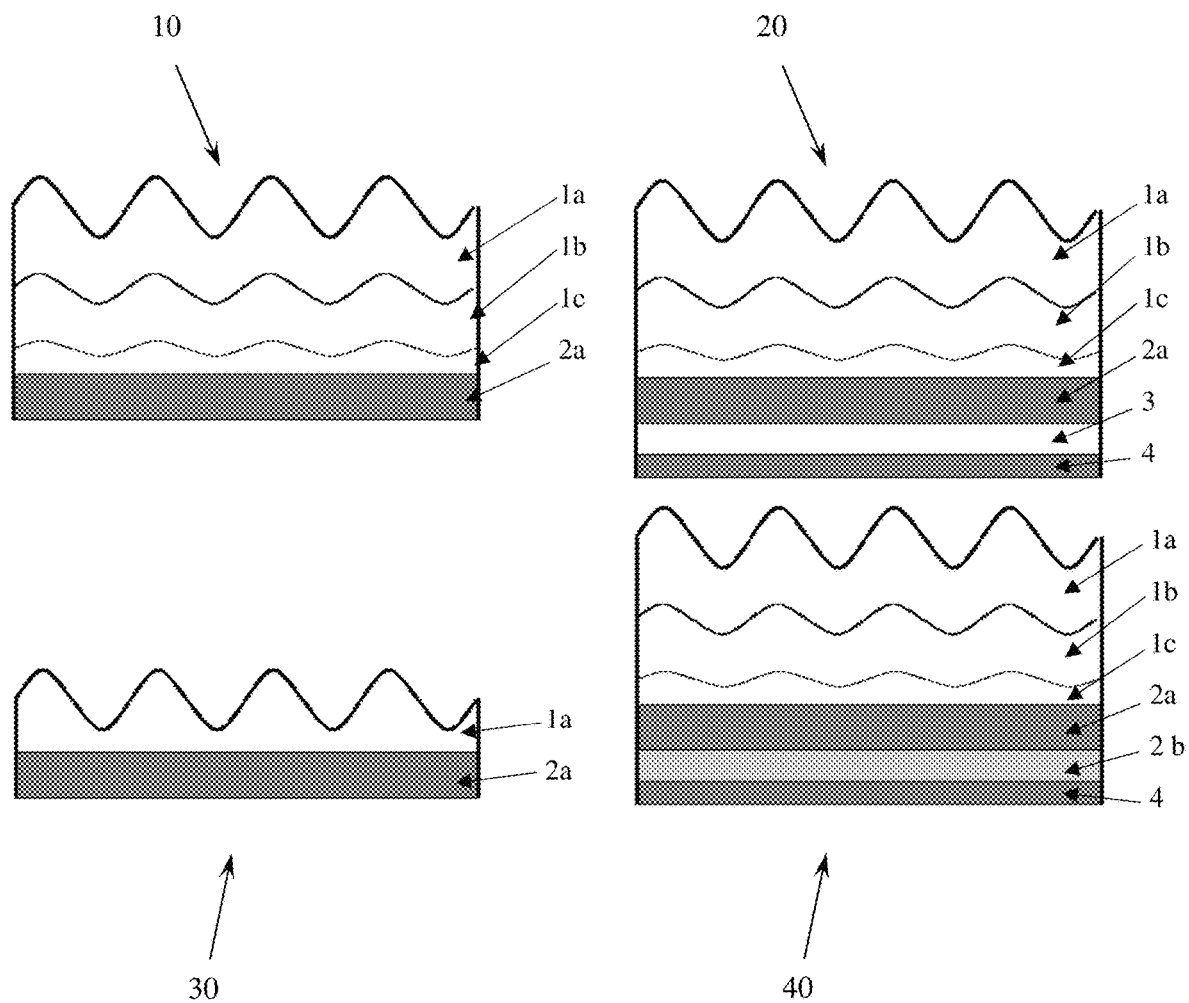
FIG. 1 shows the layer construction of various embodiments of multilayered films for the exterior surface of a component according to the invention.

FIG. 1 shows the layer construction of various multilayered films 10, 20, 30 and 40 for the exterior surface of a component according to the invention during production, the films here being produced in a transfer coating method, such that the underside of the respective exemplary embodiments of layer constructions/layer composite systems in FIG. 1 constitutes the later exterior of the film and thus of the entire component according to the invention. The same also applies to the illustrations in FIG. 2.

In this case, FIG. 1 firstly shows the layer construction of a film 10 situated on the exterior of a component according to the invention and composed of three non-colored, transparent, i.e. substantially completely light-transmissive plies or layers 1a, 1b and 1c, which were spread on successively, such that the rear side of the ply 1c is planar to the greatest possible extent. A colored but still translucent film layer 2a then follows.

FIG. 1 likewise shows the layer construction of another embodiment of a film 20 situated on the exterior of a component according to the invention. In the case of the film 20, in addition and adjacent to the ply or layer 2a, a further non-colored, transparent layer 3 and a once again colored layer 4 are also applied with a different thickness than the layer 2a. Such a construction can advantageously be used for the fine setting of the transparency or translucency.

In a further embodiment of a film 40 situated on the exterior of a component according to the invention, it is provided that, for setting the light transmissivity, plies or layers 2a, 2b and 4 colored to different degrees can also be used, which additionally have a different thickness.

The exemplary embodiment of a film 30 situated on the exterior of a component according to the invention shows that in certain cases a transparent non-colored, superficially grained polymer layer also suffices to achieve a planar underside which can additionally be adjoined by a colored translucent polymer ply, which then forms the exterior of the film and thus of the entire component according to the invention.

Figure 2:
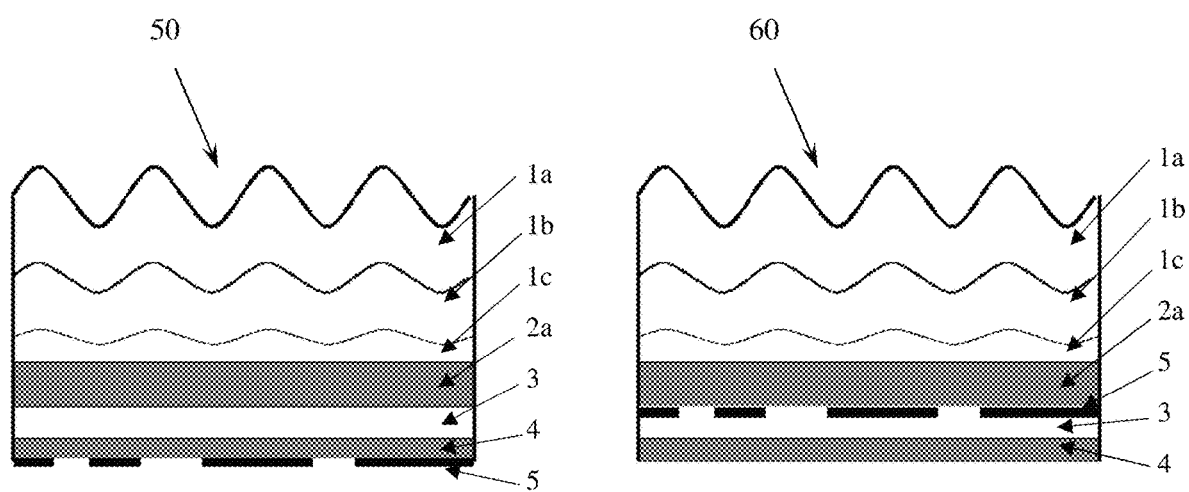
FIG. 2 shows the layer construction of further embodiments of multilayered films for the exterior surface of a component according to the invention.

FIG. 2 shows exemplary embodiments of the layer construction of further multilayered films 50 and 60 for the exterior surface of a component according to the invention.

In the embodiment of a film 50 situated on the exterior of a component according to the invention, it is provided that an electrically conductive functional layer 5 can be situated on the rear side of the layer composite, which functional layer was applied by printing in this case.

The embodiment of a film 60 situated on the exterior of a component according to the invention shows that the electrically conductive functional layer 5 can also be situated within a layer composite according to the invention.

A description is given below of how, for example, a layer composite situated on the exterior of a component according to the invention or an exterior film 10 can be produced in a transfer coating method.

Firstly, a non-colored aliphatic polycarbonate ester-polyether polyurethane dispersion (Impranil DLU, Covestro) is applied to a grained carrier paper and is dried for 3 min at 100° C., with the result that a first ply or layer 1a having a grammage of approximately 50 g/m² is obtained.

A doctor blade is used to spread onto said first layer a second layer 1b composed of polyurethane high solids composition (solids content approximately 95.6%) with an application of approximately 130 g/m², consisting of Impranil HS 80 (butanone oxime-blocked isocyanate prepolymer, Covestro), Baxxodur E331 (diamine crosslinker, BASF) and methoxypropyl acetate in a ratio of 100:8.6:5. This layer is cured for 3 min at 170° C.

A third layer or ply 1c having the same formulation is spread onto the second layer with approximately 70 g/m² and is cured in the same way.

The layer composite then produced, which is planar to the greatest possible extent, then has applied to it a further layer 2a, namely a colored or pigmented composition with approximately 140 g/m². The formulation of the composition is identical to the formulation of the composition from the layers 1b and 1c, except that this time 3 parts of a solvent-containing black pigment preparation (19% pigment proportion gas black, 38% solvent proportion, 43% acrylate resin) are also added.

A test specimen was stamped (5×20 cm) from the film 10 thus produced and was extended in a Zwick tension-extension testing machine 1000 times in each case to 30 and 50% (100 mm/min extension rate) and was subsequently relaxed again with zero force. After the test cycles, the residual extension of the film was determined as 0% (measured 5 minutes after the end of the test cycle).

If a high solids polymer composition consisting of Impranil HS 80, Impranil HS 62 (both butanone oxime-blocked isocyanate prepolymers, Covestro), Baxxodur E331 (di-amine crosslinker, BASF) and methoxypropyl acetate in a ratio of 50:50:7.1:5 or a mixture of Larithane LS 969 (butanone oxime-blocked isocyanate prepolymer, Novotex) and Baxxodur E331 is used in the example described above, then a film structure still having a residual extension of just 1.5% after 1000 test cycles (measured 5 minutes after the end of the test cycle) is obtained in each case.

LIST OF REFERENCE SIGNS

Part of the Description 1a-1c Light-transmissive ply or layer
2a-2b Colored, translucent layer
3 Non-colored, transparent layer
4 Colored, translucent layer
5 Functional layer

The invention claimed is:

1. A deformable haptic film comprising:
   a pigmented layer formed on a light source of an interior trim component of a vehicle, the pigmented layer have a pattern of varied pigment;
   a plurality of light transmissive plies formed on the pigmented layer and being deformable;
   an electrically conductive layer formed on the plurality of light transmissive plies, the layer having varied regions of conductivity; and
   wherein the pigmented layer, the plurality of light transmissive plies and the conductive layer are deformable from 30 to 50 percent and have a residual extension of 0 percent.

2. The film of claim 1, wherein the plurality of light transmissive plies comprise polyurethane.

3. The film of claim 1, the plurality of light transmissive plies comprise latex.

4. The film of claim 1, the pigmented layer represents a symbol.

5. The film of claim 1, wherein a stencil consisting of light-nontransmissive material and having light-transmissive cutouts is laminated in or arranged between light source and cover layer.

6. The film of claim 1, wherein devices are arranged within the electrically conductive layer.

7. The film of claim 1, the plurality of light transmissive plies comprise:
   a first ply having a non-colored aliphatic polycarbonate ester-polyether polyurethane dispersion; and
   a second ply comprised of polyurethane high solids composition (solids content approximately 95.6%) with an application of approximately 130 g/m².

8. The film of claim 1, the pigmented layer formed having a solvent-containing black pigment preparation that has 19% pigment proportion gas black, 38% solvent proportion, 43% acrylate resin.

* * * * *